United States Patent
Van Druten et al.

(10) Patent No.: US 6,503,166 B1
(45) Date of Patent: Jan. 7, 2003

(54) VEHICLE DRIVE ASSEMBLY

(75) Inventors: Roëll M. Van Druten, Schijndel (NL); Marc A. Mussaeus, Eindhoven (NL); Bas G. Vroemen, Eindhoven (NL); Alexander F. A. Serrarens, Eindhoven (NL); Pieter A. Veenhuizen, Goirle (NL)

(73) Assignee: Van Doorne's Transmissie B.V., Tilburg (NL)

( * ) Notice: Subject to any disclaimer, the term of this patent is extended or adjusted under 35 U.S.C. 154(b) by 0 days.

(21) Appl. No.: 09/674,001

(22) PCT Filed: Apr. 21, 1999

(86) PCT No.: PCT/EP99/02837
§ 371 (c)(1),
(2), (4) Date: Oct. 24, 2000

(87) PCT Pub. No.: WO99/55549
PCT Pub. Date: Nov. 4, 1999

(30) Foreign Application Priority Data

Apr. 24, 1998 (EP) .............................................. 98201321

(51) Int. Cl.[7] ............................................... F16H 37/02
(52) U.S. Cl. ....................................... 475/210; 475/218

(58) Field of Search .................................. 475/210, 212, 475/218, 214

(56) References Cited

U.S. PATENT DOCUMENTS

| 4,495,836 | A | * | 1/1985 | Cohen .......................... 74/751 |
| 4,950,208 | A | * | 8/1990 | Tomlinson ..................... 474/71 |
| 5,445,580 | A | * | 8/1995 | Parraga Garcia ............ 477/211 |
| 5,569,108 | A | * | 10/1996 | Cadee et al. ..................... 475/1 |

FOREIGN PATENT DOCUMENTS

| DE | 2710532 | 9/1977 |
| EP | 0 043 909 A1 | 1/1982 |
| EP | 0 058 720 B1 | 9/1982 |
| EP | 0 127 986 | 12/1984 |

* cited by examiner

Primary Examiner—Sherry Estremsky
Assistant Examiner—Tisha D. Lewis
(74) Attorney, Agent, or Firm—Young & Thompson

(57) ABSTRACT

A drive assembly for operatively connecting at least one drive input unit and at least one drive output unit in a motorized vehicle, including a transmission unit, with an epicyclic gearing operatively arranged in parallel to the transmission unit, one rotational member of the epicyclic gearing being provided with a flywheel function.

15 Claims, 6 Drawing Sheets

VEHICLE DRIVE ASSEMBLY

Figure 1:
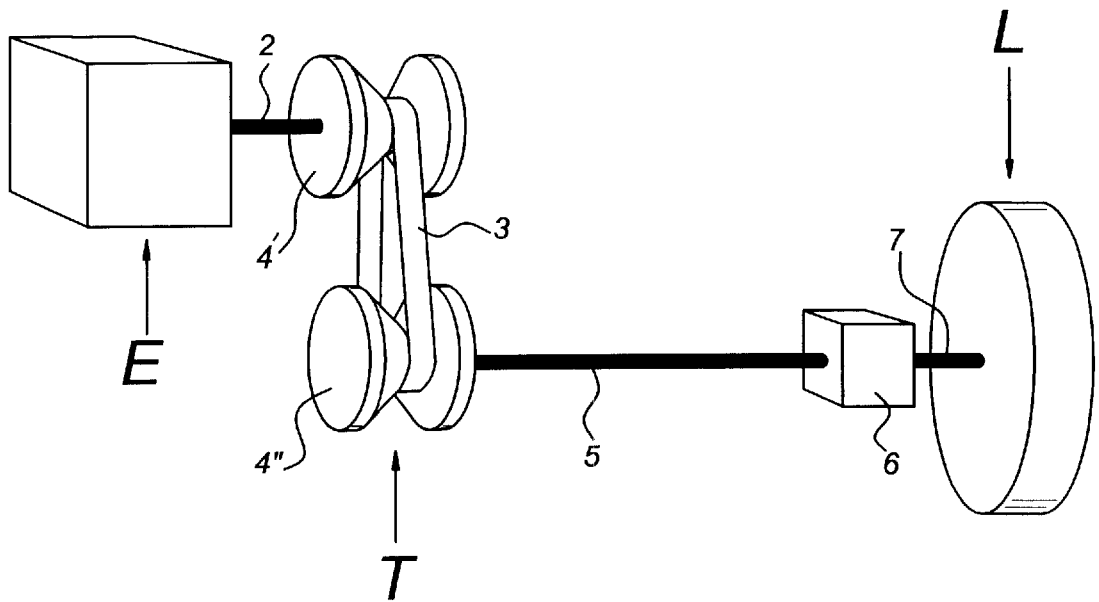
Figure 2:
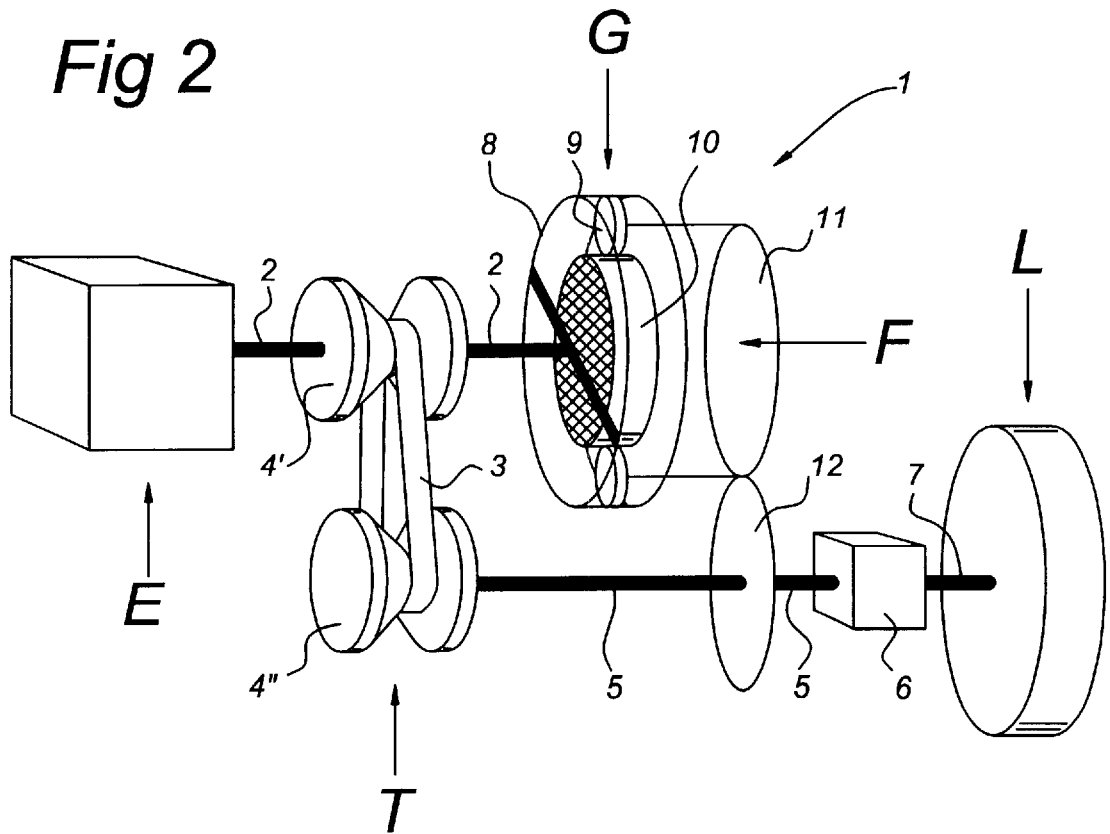
Figure 3:
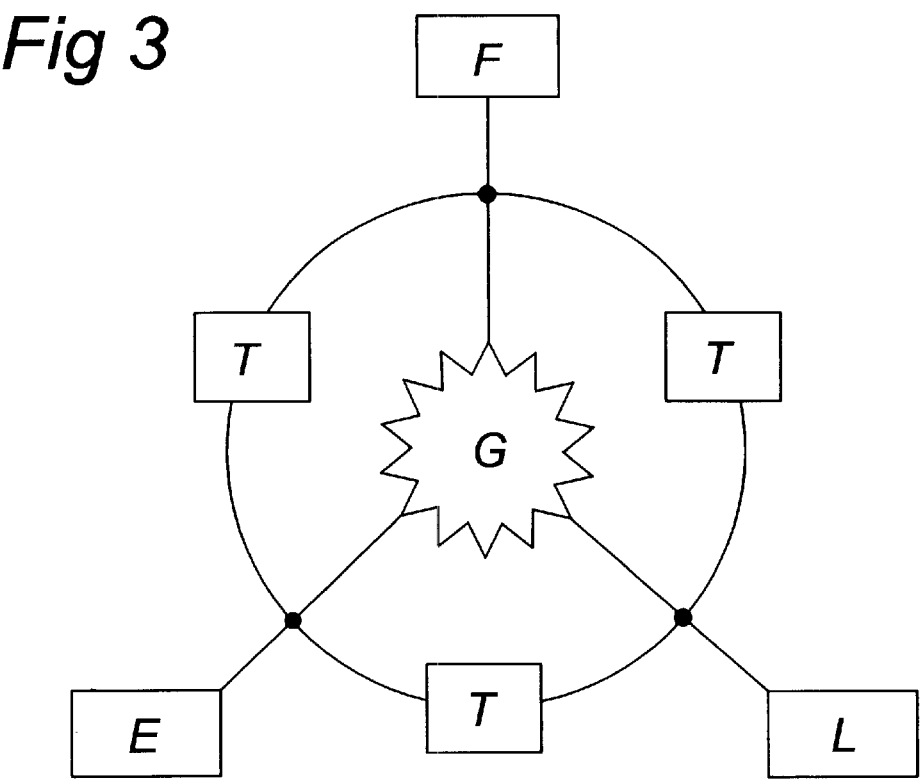
Figure 4:
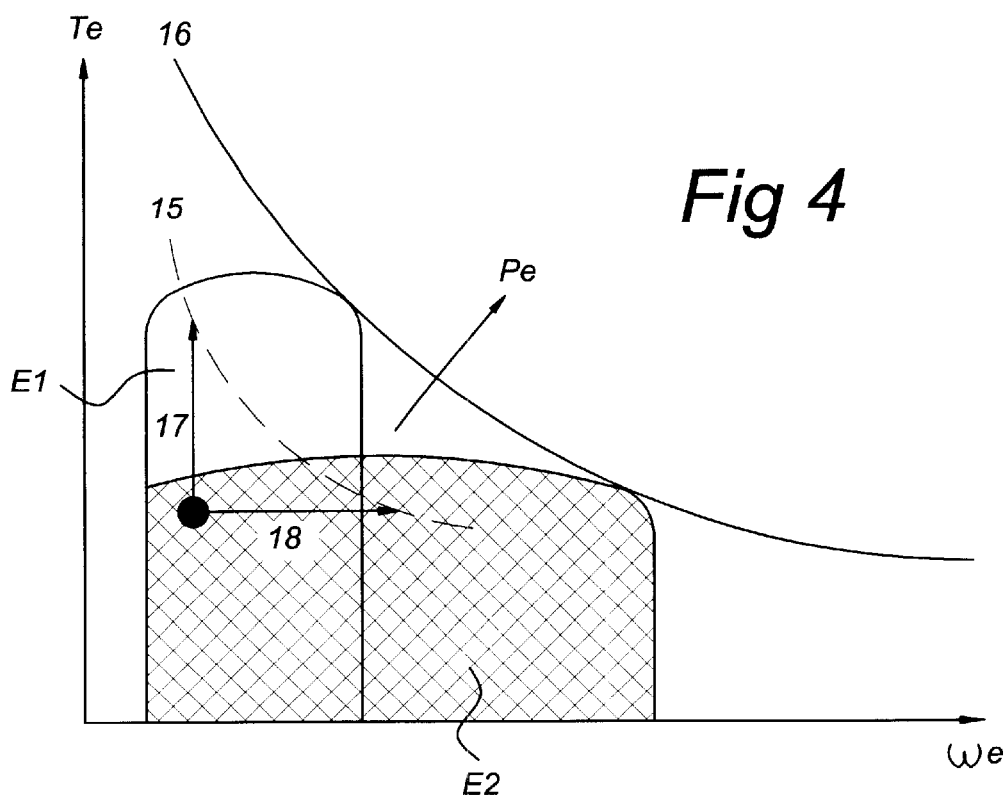
Figure 5:
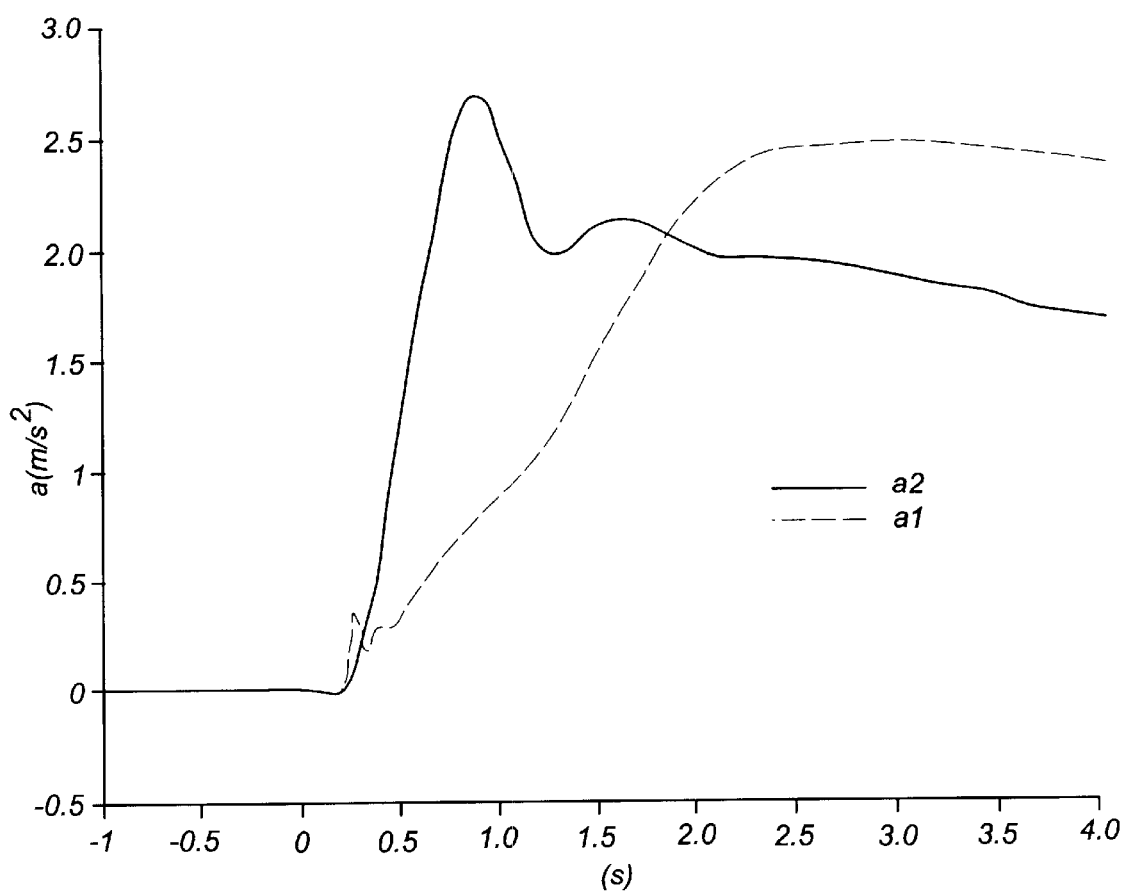
Figure 6A:
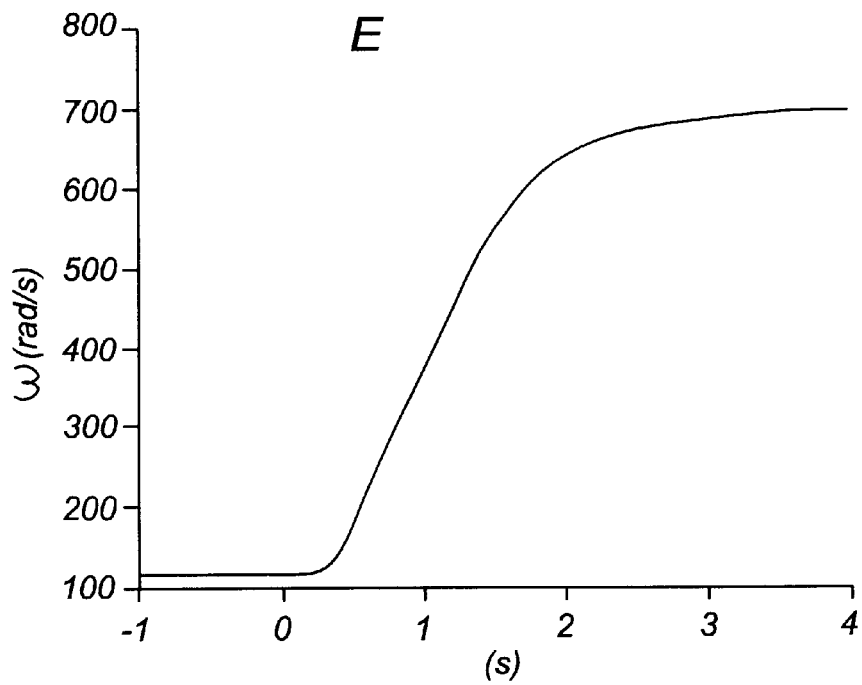
Figure 6B:
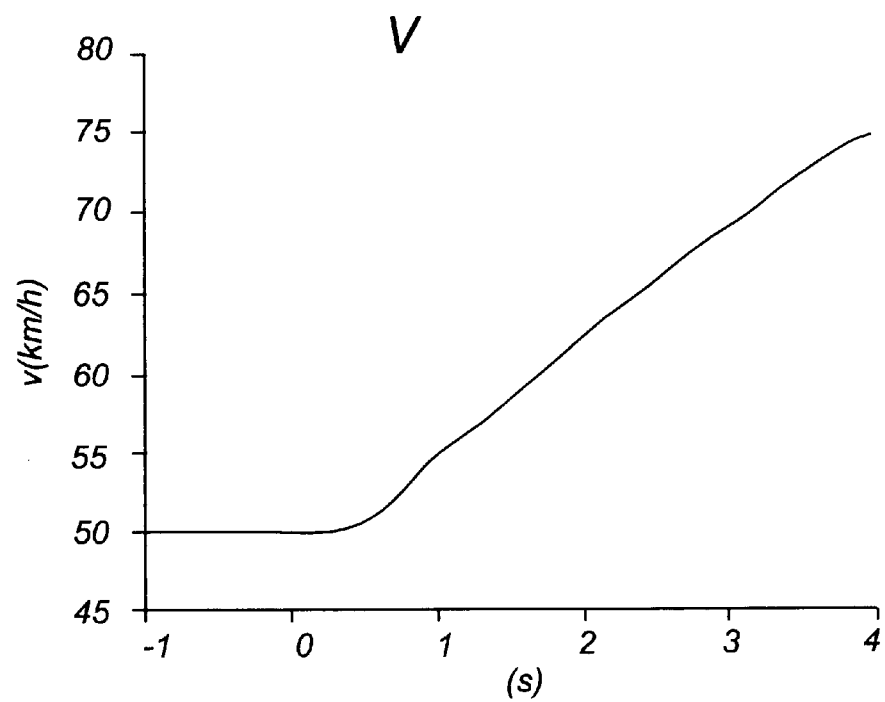
Figure 6C:
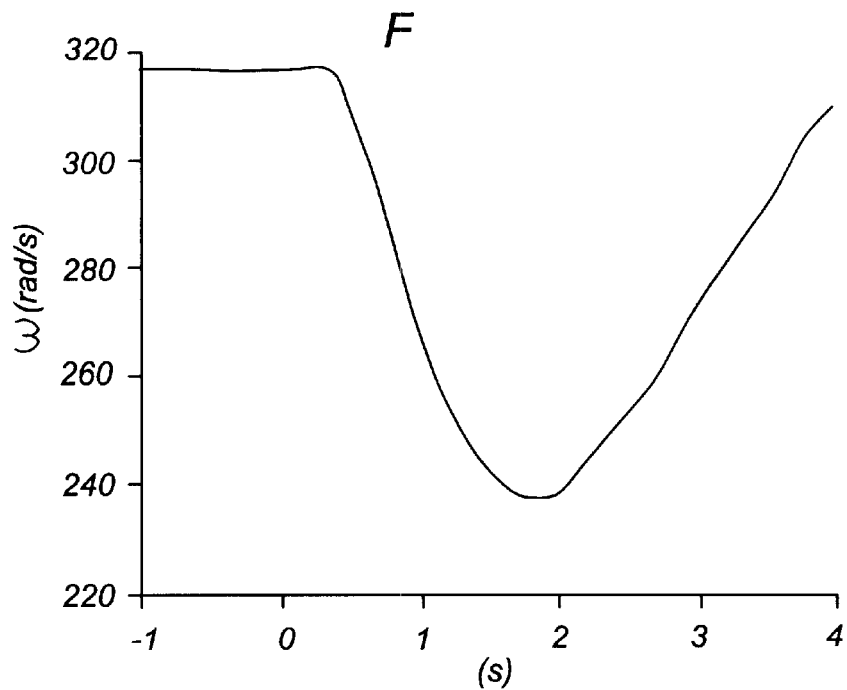
Figure 6D:
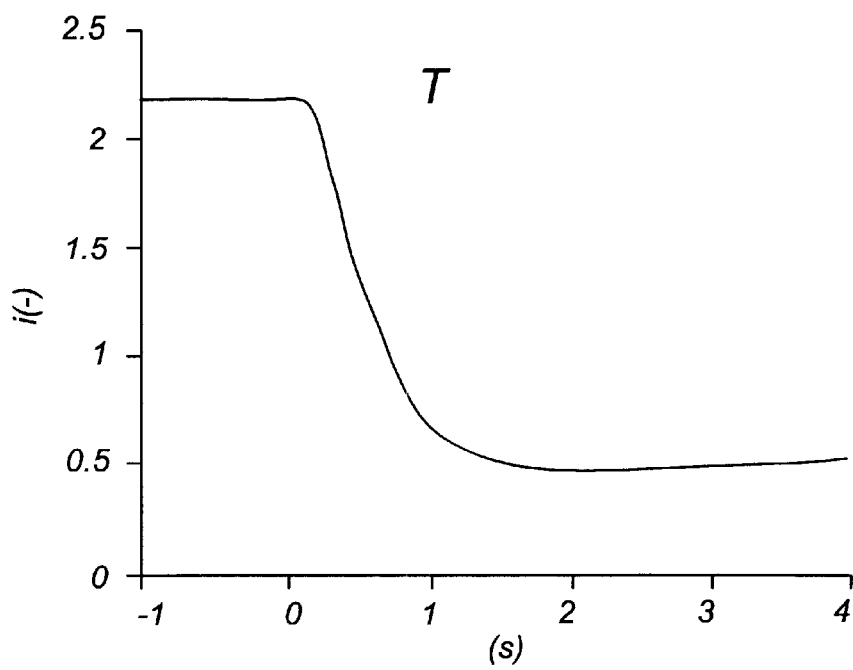
Figure 7:
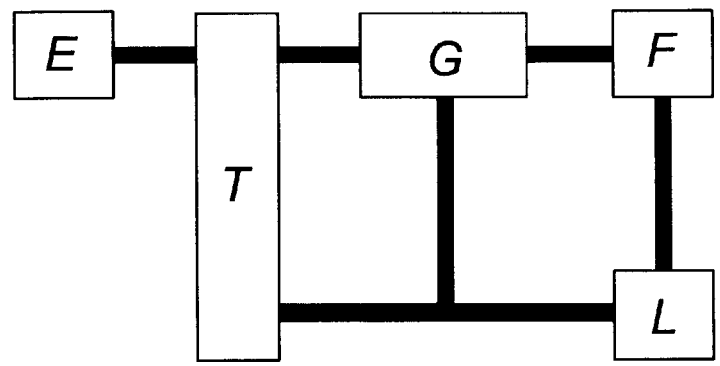
Figure 8:
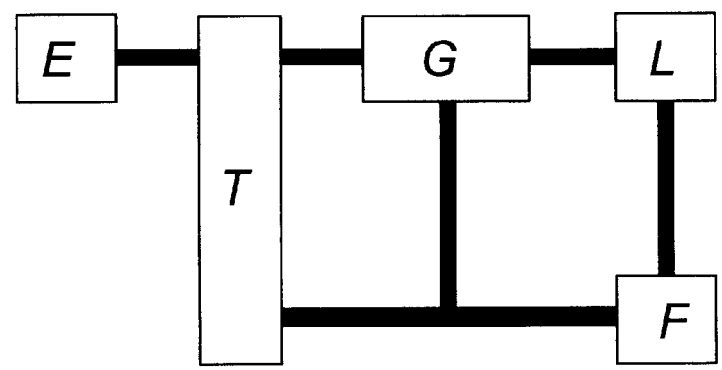
Figure 9:
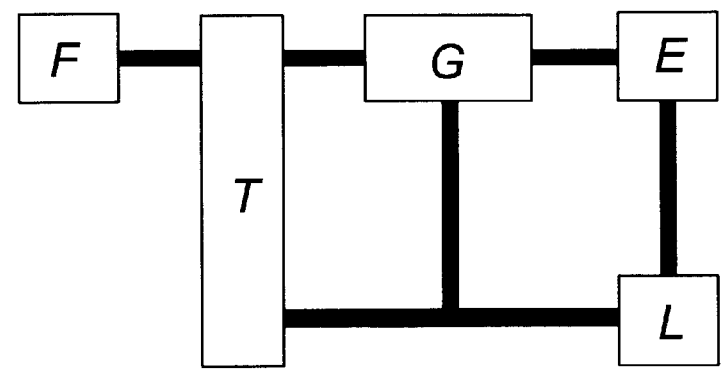

The present invention relates to a drive assembly for arrangement thereof between a drive-input unit, a drive output unit, and a transmission unit.

Such an assembly is known from European patent application EP-A-0.127.986. In this known construction the drive unit is composed by a combustion engine and the load by the vehicle, driven via one or more wheels thereof. In the known assembly the transmission is continuously variable, and a flywheel is arranged to be selected at driving off conditions for fuel economy. The known construction hereto requires clutches and controls for selecting there between, rendering the construction relatively expensive and complicated.

It is in automotive engineering an ongoing issue to reduce energy consumption at use of the vehicle. One way of achieving this is to minimise the size of the drive unit. This reduces weight to be moved and provides an optimal use of the drive unit and, at combustion engines, usually provides better combustion efficiency. A disadvantage of so-called small drive units is the bad load response, i.e. its unfavourable acceleration delay, due to necessary engine speed up. The present invention aims amongst others at favourably enabling the application of such drive units.

A known drive assembly used in co-operation with small drive units is embodied by the so-called Integrated Motor Assist system as commercialised by Honda. It comprises an electrical motor coupled in series with a continuously variable transmission between a drive unit composed by a combustion engine and a load composed by a drive axle of the vehicle. The problem of insufficient acceleration response is in this construction solved through the presence of an electrical accumulator providing additional power at acceleration, thus assisting the combustion engine. The battery is fed by the engine during less requiring operating conditions (and/or by absorbing braking energy). The known drive assembly is advantageous in that due to the presence of the accumulator the internal combustion engine can be chosen to be one with relatively low maximum engine torque, usually a relatively small engine. Disadvantages of the known construction relate to the use of, and the conversion of kinetic energy into electrical energy and the weight and cost of the electrical installation.

It is the object of the present invention to provide a drive assembly enabling the utilisation of energy saving, relatively light drive units while maintaining the advantage of utilising conventional i.e. mechanical technology and while keeping costs and weight of the assembly down. According to the invention this can be achieved by applying a construction as described in the characterising portion of claim 1. In the construction according to the invention an epicyclic gearing know per se is utilised. This is done in such a manner that a rotational member may, alternating in time, operate as an output member and as an input member. Also, one rotational member is provided with a flywheel function i.e. it is provided as a flywheel or operatively connected therewith. A desired ratio between two of the rotational members of the gearing is realised by a transmission operatively connecting two members. In such arrangement the kinetic energy absorbed by the flywheel during drive conditions will be released in either or both directions of the drive unit and load during acceleration of the drive unit, thereby assisting the drive unit. The construction is favourable in that it uses conventional technology with readily available components in a relatively simple configuration, while the weight of the flywheel to be used may be kept relatively low. Also, the construction may be used in combination with any of the known types of transmission.

It is remarked that drivelines utilising a flywheel as a kinematic accumulator are known per se. They are applied in a manner enabling the drive of the vehicle only, rather than being capable of assisting the engine as according to the invention. In a usual configuration such flywheel is in parallel coupled to an input shaft of a transmission, parallel to a drive unit, such that drive unit and flywheel may alternatively operate as a power source for driving the load. Since the flywheel is only capable of unloading energy when slowing down it can not be used to assist an engine in raising its rotational speed as intended by the invention.

It is further remarked that the use of epicyclic gearing for automotive transmission, in particular planetary stages, is generally known. The purposes of utilisation differ from that of the present invention in that they are normally applied as a transmission for improvement of the efficiency of a continuously variable transmission used in combination herewith or to change the ratio coverage of a transmission applied in combination herewith. In the construction known from international patent application WO 96/35063 a planetary stage is provided operatively between engine and load, and a continuously variable transmission is arranged between the pinion carrier thereof and either the sun or the ring gear. In this construction the carrier is connected to the engine and the sun is connected to the vehicle. It is in the art also known that epicyclic gearings may be used to increase the overall transmission efficiency while reducing the ratio coverage or, vice versa, to increase ratio coverage to the detriment of the overall transmission efficiency. It is further remarked that the use in parallel of a planetary stage and a CVT between an input unit and an output unit, each being one of three inertia components is known per se. European patent publication EP-A-0.058.720 discloses a stand by energy source having such arrangement and indicated to be intended for equipment in which energy must be supplied absolutely continuously. The known arrangement differs from the present construction in that the automotive application primarily deals with the dynamic interaction between three moving inertia components while in use, in particular during vehicle acceleration as may be desired or necessary in traffic conditions. The present invention in particular differs from the known arrangement in that it teaches how to use a light weight efficiently operating engine for a vehicle without detrimental effect to the drivability of the vehicle.

The invention will further be explained by way of example along a drawing wherein:

FIG. I represents a conventional lay out of a driveline;

FIG. II represents a driveline according to the invention;

FIG. III is a diagram representing possible configurations according to the invention;

FIGS. IV to VI schematically illustrate the working and the effects reached by the invention;

FIGS. VII to IX are schematic representations of further configurations according to the invention.

FIG. I represents a conventional drive line comprising a drive unit E, e.g. a combustion engine, a drive assembly T, here in the form of a continuously variable transmission (CVT) of the push belt type, and a load L to be driven, in this case a vehicle, represented by an inertia in the form of a wheel. The drive unit E drives the transmission T via axis 2 which for the purpose if this explanation represents both the outgoing axis of the drive unit E and the ingoing axis of the transmission T. Between transmission T and load L an optional final reduction gear 6 is represented, operatively having the output axis 5 of the transmission as input axis, and operatively being connected to the load L via axis 7. The CVT is known per se, and essentially comprises a metal push belt 3 for transmitting force from one pulley 4' to another pulley 4". The pulleys comprise a set of conical sheaves between which the belt 3 is clamped. The transmission ratio may be varied continuously by moving the sheaves to or away from one another thereby applying suitable movement means.

In FIG. II, according to the invention, the drive assembly of FIG. I is extended by an epicyclical gearing G, here in the form of a planetary stage known per se. The gearing is arranged such that a first member thereof, in this case the annulus or ring gear, is operatively connected with the engine drive unit T, in this case via drive axis 2. A further member in the example, the pinion gear carrier 11, carrying pinions 9, is via gear 12 operatively connected to the axis 5 as indicated schematically in figure II by gear 12. For achieving a correctly functioning connection, an intermediate gearwheel should be applied between gears 11 and 12, or a chainlike connection should be applied. Axis 5 is connected to load L directly, or via reduction gear 6. Further according to the invention a flywheel F is associated with a third gearing member, in this example the sun wheel 10. As depicted in this case the sun wheel 10 embodies the flywheel F. The flywheel F may also operatively be connected with the third member e.g. via a toothed gearing or by bolting a flywheel against the sun gear 10. According to the invention the flywheel F, may replace any flywheel of the drive unit E as usually present in combustion engines or may cause lower weight requirement therefore.

FIG. III represents in a diagram an abstraction of the drive system conceived by the present invention. The drive system consists of at least three inertia components, flywheel F, drive unit E and Load L, at least one of which represents a power source and of two transmission components, being transmission unit T and epicyclic gearing G. The transmission is according to the invention operatively arranged in parallel to the epicyclic gearing G. Thus in any conceivable configuration its position can be interchanged with that of the gearing G. Further, each inertia component E, F, L may operatively be connected to any of at least three rotary members 8, 10, 11 of the epicyclic gearing G however, each component E, F, L to a different member 8, 1 0, 11. Also, the transmission may operatively be connected between any two of the inertia components E, F, L. The transmission T may be of any type. Further, clutches, torque converters or gear transmissions may according to the invention be applied in any operative connection between two of the mentioned components within the depicted system.

In the drive assembly according to the invention use is made of both the power splitting and the transmission capacities of an epicyclic gearing in the proposed parallel arrangement with the transmission unit. Its application according to the invention enables the flywheel to unload its kinetic energy to either the load or to the engine, or to both depending on the conditions. Further, any of the inertia components may also according to the invention be replaced by alternative inertia components such as an electric motor. The invention further encompasses the application of epicyclic gearings with a greater plurality of rotary members. These should than be mutually coupled in a manner effecting three drive input/output connections. The epicyclic gearing may according to the invention be formed of any type, including Ravigneaux gear trains, and differential gearings.

FIG. IV is a simplification of a so-called engine map wherein two different types of drive units E1 and E2, e.g. combustion engines are presented. The drive speed $\omega e$ of the drive units E is set out along the X-axis of the graph and the delivered torque Te is set out along the Y-axis. Shaded area E1 covers the torque characteristics of more or less conventional type of engines E1 capable of delivering high torques but limited to a small range of revolutions $\omega e$. Area E2 covers the torque characteristics of engine E2, a so-called high speed engine, capable of delivering the same maximum power represented by line 16, and delivering a low maximum torque, however, over a larger range of revolutions. Drive unit E1 most of the time operates far below its maximum torque capacity, which is favourable when quick acceleration is desired, but which is disadvantageous in that it operates with low efficiency most of the time. Engine E2 on the other hand is able to deliver even relatively low desired powers near its maximum torque, therefore at high efficiency but with poor acceleration response. Arrow 17 shows that with engine E1 an at least nearly instant increase in delivered power may be achieved, whereas as illustrated by arrow 18, with drive unit E2 a relatively large increase in revolutions $\omega e$ may be required to attain the same high power output, e.g. that of line 15, particularly when departing from low rotational speeds of the engine. In practice this takes time due to inertia within the drive unit and inertia coupled thereto. Such time consumption may be undesirable, particularly in the case of application in vehicles. It may be irritating to the user or may be dangerous in accidental traffic situations. With the present invention this time consumption is largely reduced in that the flywheel unloads kinematic energy by decreasing its rotational speed at the same time as the engine increases its rotational speed. This energy is hereby in principle directed to the engine, thereby quickly bringing it up to a revolutionary speed $\omega e$ with high power. Thus the disadvantage of drive unit E1 is avoided and the disadvantage of drive unit E2 is overcome, so that favourable driving characteristics are attained with an efficiently performing high speed drive unit, usually also a lighter drive unit.

In case of vehicle application of the present invention FIG. V represents an example of a vehicle with a high revolution combustion engine attaining high acceleration speed relatively slowly along line a1, and an identical engine provided with the drive assembly according to the invention, attaining high acceleration speed much quicker, along line a2. Also graphs a to d of FIG. VI represent examples of simultaneous change in time represented in seconds (s) along the X-axes, of revolutionary speed $\omega e$ of drive unit E in FIG. VIa, vehicle speed V in FIG. VIb, flywheel speed in FIG. VIc, and of transmission ratio in FIG. VId along the respective Y-axes.

FIGS. VII to IX schematically show some alternative configurations according to the invention. It will be appreciated that alternatives are attained by simply interchanging the positions of gearing G and transmission T, and by interchanging the positions of drive E, flywheel F and load L in respect of drive assembly T, G. Most practicable configurations however seem to be the configuration as figuratively represented in FIG. II and a configuration where the transmission, as deductible from FIG. III, is coupled between drive unit E and flywheel F and wherein load L is solely driven by a reaction member of gearing G.

What is claimed is:

1. Drive assembly (1) for use in a motorized vehicle, said drive assembly comprising at least three inertia components (E, F, L), which are operatively connected, wherein each of said at least three components (E, F, L) rotates during normal operation of the assembly and is capable to function as a drive input unit (E or F or L) and as a drive output unit (E or F or L) of the assembly (1), the assembly (1) comprising a kinematic transmission unit (T) and an epicyclic gearing (G) for transmitting power, characterized in that the epicyclic gearing (G) is operatively arranged in parallel to the transmission unit (T) between two of said at least three inertia components (E, F, L), and in that each of said at least three inertia components (E, F, L) is operatively connected with a separate rotational member (8, 10, 11) of the epicyclic gearing (G), one rotational member (8, 10, 11) of the epicyclic gearing (G) being provided with a flywheel function, the arrangement being such that during normal operation of the assembly the power to be transmitted may be transmitted through each one of said transmission unit (T) and said gearing (G), the connection of said at least three inertia components to said separate rotational member being free of any clutch connection.

2. Drive assembly according to claim 1, characterized in that the epicyclic gearing (G) is arranged such that any rotational member (8, 10, 11) thereof may act as a drive input member (8, 10, 11) and as a drive output member (8, 10, 11) of said epicyclic gearing (G).

3. Drive assembly according to claim 1, characterized in that one rotational member (8, 10, 11) of the gearing (G) is operatively connected to a flywheel (F), said flywheel (F) being one of said three inertia components (E, F, L).

4. Drive assembly according to claim 1, characterized in that, the epicyclic gearing (G) is composed by a planetary stage (8–11) of which the rotational axes of the rotation members are arranged in parallel.

5. Drive assembly according to claim 3, wherein the flywheel (F) is coupled to a sun wheel (10) and wherein a planetary carrier (11) and a ring gear (8) are each coupled as the input and the output member to a load (L) being said drive output unit, and the drive input unit (E) respectively.

6. Drive assembly according to claim 1, characterized in that the three rotational members (8, 10, 11) of the epicyclic gearing (G) are each operatively connected to one of the three inertia components (E, F, L), whereas two rotational members (8, 10, 11) are operatively connected to one another by means of the transmission unit (T).

7. Drive assembly according to claim 1, characterized in that, the drive input unit (E or F or L) and the drive output unit (E or F or L) represent at least two of at least a combustion engine (E), a flywheel (F) and a load (L).

8. Drive assembly (1) according to claim 1, characterized in that, one functional and of both the epicyclic gearing (G) and the transmission unit (T) is operatively connected with a drive member (2) of the drive input unit (E or F) and another functional end of both the epicyclic gearing (G) and the transmission unit (T) is operatively connected with a further drive member (5) operatively connected to the load (L).

9. Drive assembly according claim 1, characterized in that, the transmission (T) is operatively connected between a flywheel (F) and a drive input unit (E) being a combustion engine.

10. Drive assembly according to claim 5, characterized in that the transmission (T) is operatively connected between said flywheel (F) and said load (L).

11. Drive assembly according to claim 1, characterized in that the assembly is designed for a load based on a vehicle for which the assembly is to be applied.

12. Drive assembly (1) according to claim 1, characterized in that, the transmission unit (T) is an automatic transmission.

13. Drive assembly according to claim 1, characterized in that, the transmission unit (T) is a continuously variable transmission.

14. Power unit comprising at least three inertia components (E, F, L), which are operatively connected, wherein each of said at least three components (E, F, L) rotates during normal operation of the assembly and is capable to function as a drive input unit (E or F or L) and as a drive output unit (E or F or L) of the assembly (1), the assembly (1) comprising a kinematic transmission unit (T) and an epicyclic gearing (G) for transmitting power, characterized in that the epicyclic gearing (G) is operatively arranged in parallel to the transmission unit (T) between two of said at least three inertia components (E, F, L), and in that each of said at least three inertia components (E, F, L) is operatively connected with a separate rotational member (8, 10, 11) of the epicyclic gearing (G), one rotational member (8, 10, 11) of the epicyclic gearing (G) being provided with a engine flywheel function, the arrangement being such that during normal operation of the assembly the power to be transmitted may be transmitted through each one of said transmission unit (T) and said gearing (G), the connection of said at least three inertia components to said separate rotational member being free of any clutch connection, wherein one drive input unit is a combustion engine, and wherein the engine flywheel function is performed via one rotational member of said epicyclic gearing (8, 10, 11).

15. Vehicle provided with at least three inertia components (E, F, L), which are operatively connected, wherein each of said at least three components (E, F, L) rotates during normal operation of the assembly and is capable to function as a drive input unit (E or F or L) and as a drive output unit (E or F or L) of the assembly (1), the assembly (1) comprising a kinematic transmission unit (T) and an epicyclic gearing (G) for transmitting power, characterized in that the epicyclic gearing (G) is operatively arranged in parallel to the transmission unit (T) between two of said at least three inertia components (E, F, L), and in that each of said at least three inertia components (E, F, L) is operatively connected with a separate rotational member (8, 10, 11) of the epicyclic gearing (G), one rotational member (8, 10, 11) of the epicyclic gearing (G) being provided with a flywheel function, the arrangement being such that during normal operation of the assembly the power to be transmitted may be transmitted through each one of said transmission unit (T) and said gearing (G), the connection of said at least three inertia components to said separate rotational member being free of any clutch connection.

* * * * *